US010833930B2

(12) United States Patent
Adolphson

(10) Patent No.: US 10,833,930 B2
(45) Date of Patent: *Nov. 10, 2020

(54) METHODS AND APPARATUS TO CONVERT ROUTER CONFIGURATION DATA

(71) Applicant: AT&T Intellectual Property I, L.P., Atlanta, GA (US)

(72) Inventor: Gregory Blaine Adolphson, Allen, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 73 days.

This patent is subject to a terminal disclaimer.

(21) Appl. No.: 16/237,693

(22) Filed: Jan. 1, 2019

(65) Prior Publication Data

US 2019/0140901 A1 May 9, 2019

Related U.S. Application Data

(63) Continuation of application No. 14/975,848, filed on Dec. 20, 2015, now Pat. No. 10,171,296, which is a (Continued)

(51) Int. Cl.
*H04L 12/24* (2006.01)
*H04L 12/701* (2013.01)
(Continued)

(52) U.S. Cl.
CPC ...... *H04L 41/0813* (2013.01); *H04L 41/0803* (2013.01); *H04L 41/12* (2013.01); (Continued)

(58) Field of Classification Search
CPC ......... H04L 41/12; H04L 45/02; H04L 45/00; H04L 45/04; H04W 84/18
(Continued)

(56) References Cited

U.S. PATENT DOCUMENTS 5,790,548 A 8/1998 Sistanizadeh et al.
5,915,008 A 6/1999 Dulman
(Continued)

FOREIGN PATENT DOCUMENTS

WO 9823080 5/1998
WO 2007001941 1/2007

OTHER PUBLICATIONS

Braun et al., "A Linux Implementation of a Differentiated Services Router," Next Generation Networks, Networks and Services for the Information Society, Springer, Berline, Heidelberg, 2000, 12 pages.
(Continued)

*Primary Examiner* — Peter G Solinsky
*Assistant Examiner* — Sanjay K Dewan
(74) *Attorney, Agent, or Firm* — Amin, Turocy & Watson, LLP

(57) ABSTRACT

Methods and apparatus to convert configuration data associated with a first router are disclosed. An example apparatus includes a selector tool to identify a first port of a first router having a first set of data lines, and identify, via the selector tool, a second port of a second router to receive the first set of data lines to be migrated from the first port of the first router. The first router and the second router use different, incompatible configuration data formats. A data transceiver is to capture first port configuration data associated with the first port of the first router. A configuration data converter is to identify a type of interface associated with the captured first port configuration data and convert the captured first port configuration data from a first format compatible with the first router to a second format compatible with the second router based on the identified type of interface. A conversion file generator is to generate a configuration file containing the converted first port configuration data in the second format.

20 Claims, 12 Drawing Sheets

Related U.S. Application Data continuation of application No. 14/093,444, filed on Nov. 30, 2013, now Pat. No. 9,253,043.

(51) Int. Cl.
*H04L 12/26* (2006.01)
*H04L 12/751* (2013.01)

(52) U.S. Cl.
CPC .......... *H04L 43/0894* (2013.01); *H04L 45/00* (2013.01); *H04L 45/02* (2013.01)

(58) Field of Classification Search
USPC ........................................................ 370/254
See application file for complete search history.

(56) References Cited

U.S. PATENT DOCUMENTS

| | | | |
|---|---|---|---|
| 6,130,892 A | 10/2000 | Short et al. | |
| 6,289,414 B1 | 9/2001 | Feldmeier et al. | |
| 6,493,341 B1 | 12/2002 | Datta et al. | |
| 6,981,055 B1 | 12/2005 | Ahuja et al. | |
| 7,145,898 B1 | 12/2006 | Elliott | |
| 7,293,106 B2* | 11/2007 | Natarajan | H04L 41/00 |
| | | | 370/254 |
| 7,352,706 B2 | 4/2008 | Klotz et al. | |
| 7,430,602 B2 | 9/2008 | Babbar et al. | |
| 7,571,168 B2 | 8/2009 | Bahar et al. | |
| 7,630,300 B2 | 12/2009 | Warren et al. | |
| 7,971,244 B1* | 6/2011 | Kajekar | H04L 63/101 |
| | | | 709/224 |
| 7,974,950 B2* | 7/2011 | Kaczmarski | G06F 16/122 |
| | | | 707/640 |
| 7,975,190 B2 | 7/2011 | Smith et al. | |
| 8,041,786 B2* | 10/2011 | Tindal | H04L 41/0893 |
| | | | 709/220 |
| 8,209,292 B2 | 6/2012 | Ito et al. | |
| 8,218,538 B1 | 7/2012 | Chidambaram et al. | |
| 8,223,667 B2* | 7/2012 | Duggan | H04L 41/12 |
| | | | 370/254 |
| 8,310,918 B2 | 11/2012 | Poulson et al. | |
| 8,429,647 B2 | 4/2013 | Zhou et al. | |
| 8,458,305 B2 | 6/2013 | Elzur et al. | |
| 8,483,694 B2 | 7/2013 | Lewis et al. | |
| 8,503,363 B2 | 8/2013 | Fulknier et al. | |
| 8,514,889 B2 | 8/2013 | Jayasimha et al. | |
| 8,539,032 B2* | 9/2013 | Pugaczewski | H04L 41/00 |
| | | | 709/206 |
| 9,253,043 B2 | 2/2016 | Adolphson | |
| 2001/0005383 A1* | 6/2001 | Yoshimoto | H04L 49/3081 |
| | | | 370/474 |
| 2004/0243603 A1 | 12/2004 | Komatsu | |
| 2005/0251812 A1 | 11/2005 | Hayward | |
| 2005/0262278 A1 | 11/2005 | Schmidt | |
| 2006/0262735 A1* | 11/2006 | Guichard | H04L 12/66 |
| | | | 370/254 |
| 2007/0047463 A1* | 3/2007 | Jarvis | H04L 45/7457 |
| | | | 370/254 |
| 2007/0264971 A1 | 11/2007 | Blankenship et al. | |
| 2008/0052384 A1 | 2/2008 | Marl et al. | |
| 2009/0216867 A1 | 8/2009 | Pusateri et al. | |
| 2010/0165877 A1 | 7/2010 | Shukla et al. | |
| 2010/0318917 A1 | 12/2010 | Holladay et al. | |
| 2011/0019588 A1* | 1/2011 | Boucadair | H04L 45/00 |
| | | | 370/254 |
| 2011/0134931 A1* | 6/2011 | Merwe | H04L 41/0816 |
| | | | 370/401 |
| 2011/0246669 A1 | 10/2011 | Kanada et al. | |
| 2011/0293035 A1 | 12/2011 | Kobayashi | |
| 2012/0158976 A1 | 6/2012 | Van der Merwe et al. | |
| 2012/0278807 A1 | 11/2012 | Nakagawa | |
| 2013/0060940 A1 | 3/2013 | Koponen et al. | |
| 2013/0268643 A1 | 10/2013 | Chang et al. | |
| 2013/0286894 A1* | 10/2013 | Liu | H04L 45/245 |
| | | | 370/254 |
| 2014/0156886 A1 | 6/2014 | Yu et al. | |
| 2014/0198631 A1* | 7/2014 | Cavanna | H04L 41/0806 |
| | | | 370/218 |
| 2014/0369229 A1 | 12/2014 | Martineau | |
| 2015/0078152 A1 | 3/2015 | Garg et al. | |
| 2016/0134473 A1 | 5/2016 | Adolphson | |

OTHER PUBLICATIONS

Decasper et al., "Router Plugins: A Software Architecture for Next Generation Routers," Networking, IEEE/ACM Transactions on 8.1, 2000, 12 pages.

Louati et al., "Configurable software-based edge router architecture," Computer Communications 28 (2005) 1692-1699, 8 pages.

Wang et al., "Virtual Routers on the Move: Live Router Migration as a Network-Management Primitive," ACM SIGCOMM Computer Communication Review, vol. 38, No. 4, 2008, 12 pages.

United States Patent and Trademark Office, "Non-Final Office Action," issued in connection with U.S. Appl. No. 14/093,444, dated Apr. 6, 2015, 19 pages.

United States Patent and Trademark Office, "Notice of Allowance and Fee(s) Due," issued in connection with U.S. Appl. No. 14/093,444, dated Sep. 28, 2015, 16 pages.

United States Patent and Trademark Office, "Non-Final Office Action," issued in connection with U.S. Appl. No. 14/975,848, dated Sep. 7, 2017, 41 pages.

United States Patent and Trademark Office, "Final Office Action," issued in connection with U.S. Appl. No. 14/975,848, dated Mar. 26, 2018, 88 pages.

United States Patent and Trademark Office, "Final Office Action," issued in connection with U.S. Appl. No. 14/975,848, dated Aug. 24, 2018, 86 pages.

* cited by examiner

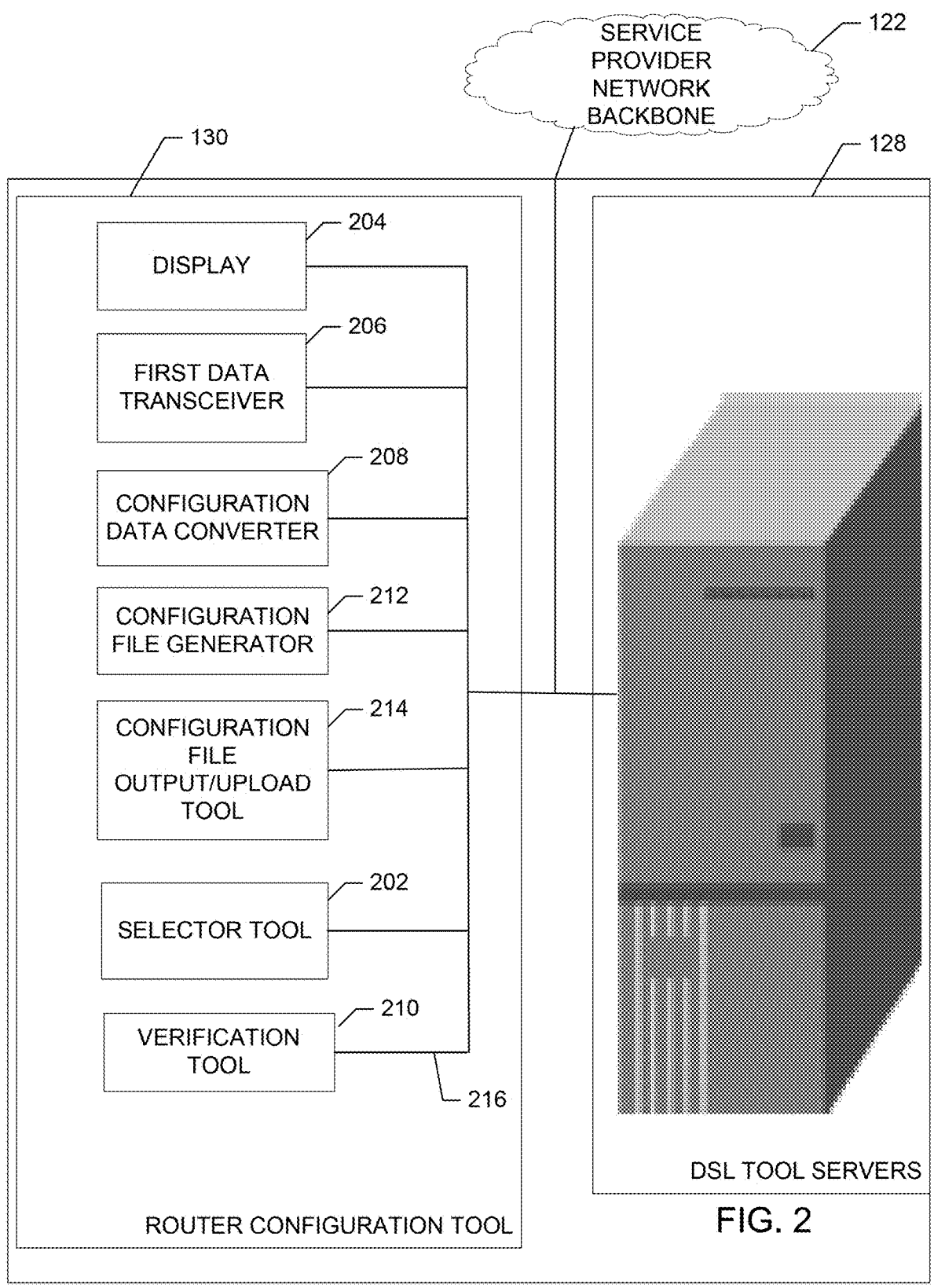

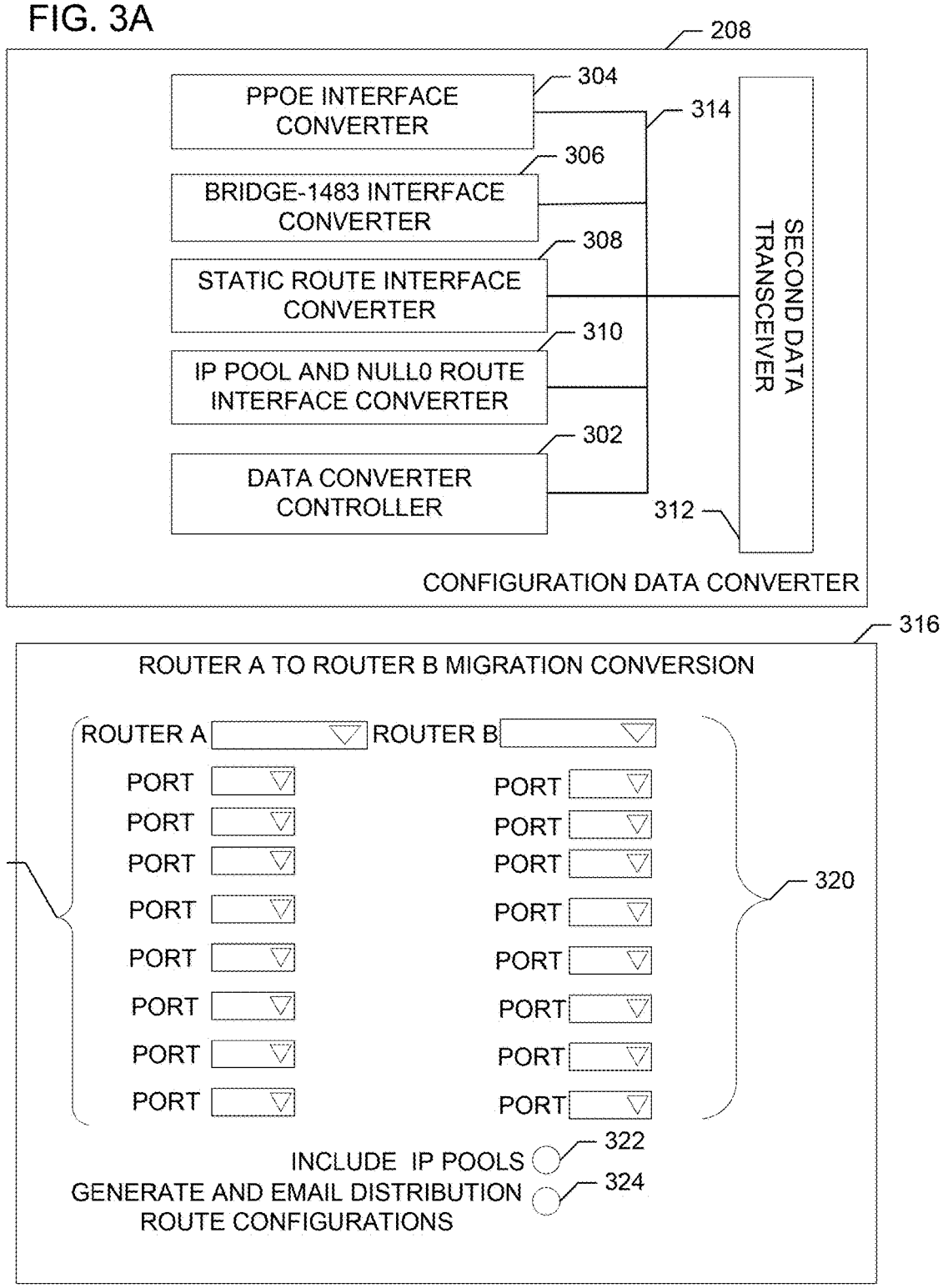

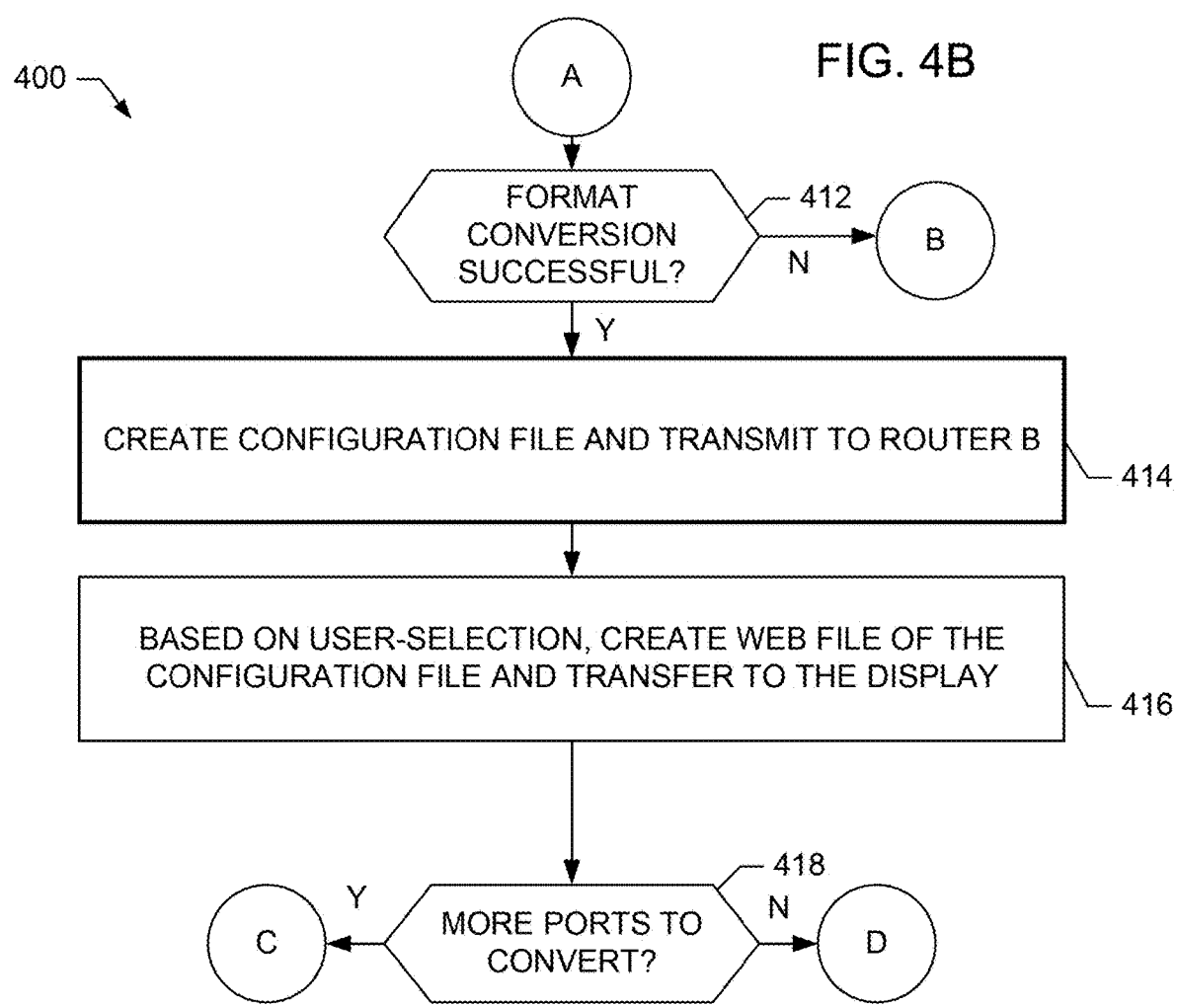

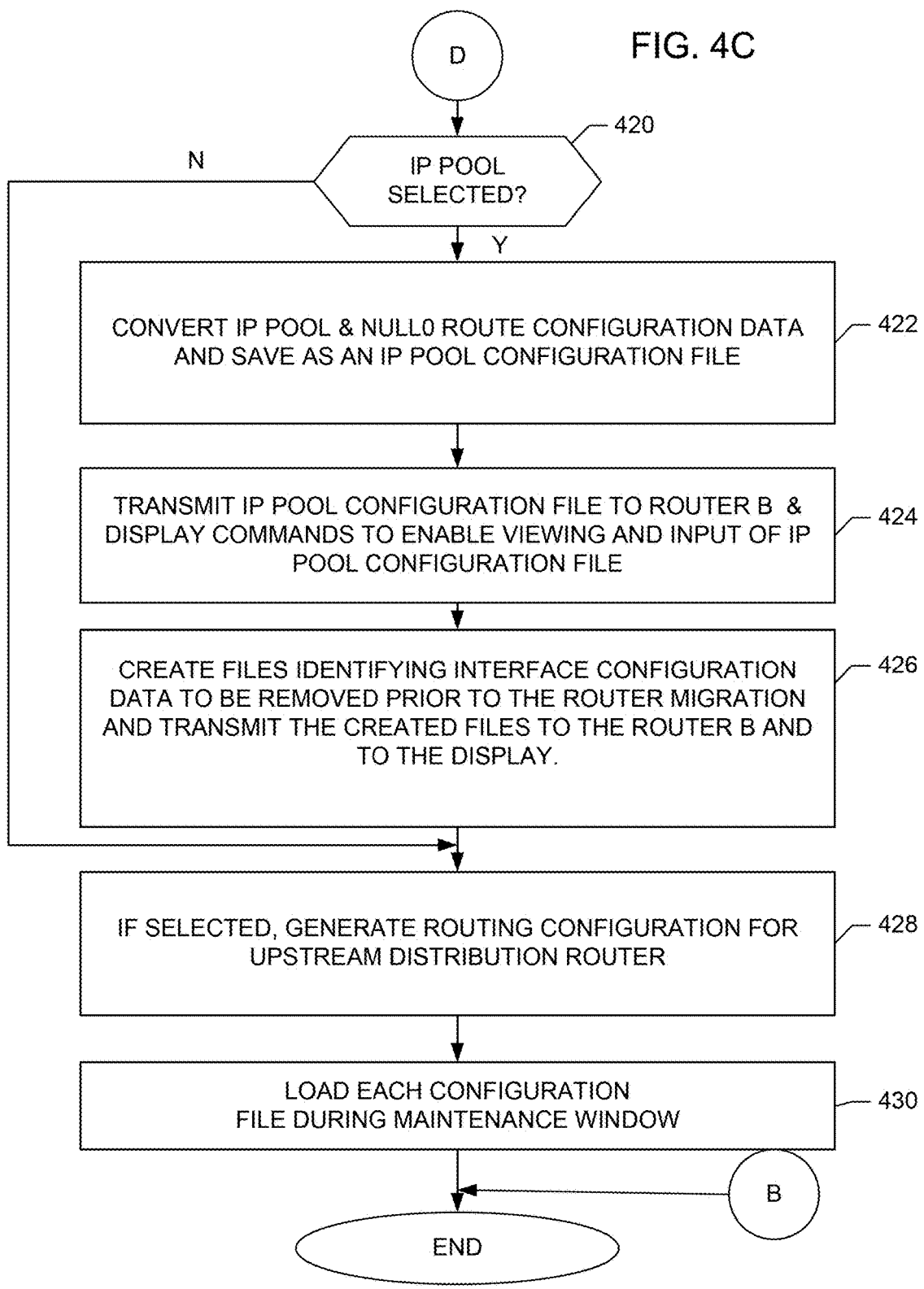

METHODS AND APPARATUS TO CONVERT ROUTER CONFIGURATION DATA

RELATED APPLICATIONS

This patent arises from a continuation of U.S. application Ser. No. 14/975,848, entitled, "Methods and Apparatus to Convert Router Configuration Data," filed Dec. 20, 2015 (now U.S. Pat. No. 10,171,296), which is a continuation of U.S. application Ser. No. 14/093,444, entitled, "Methods and Apparatus to Convert Router Configuration Data," filed Nov. 30, 2013 (now U.S. Pat. No. 9,253,043). U.S. application Ser. No. 14/975,848 and U.S. application Ser. No. 14/093,444 are hereby incorporated herein by reference in their entireties.

FIELD OF THE DISCLOSURE

This disclosure relates generally to electronic network routers and, more particularly to converting router configuration data compatible with a first router to router configuration data compatible with a second router.

BACKGROUND

Large networks can include thousands of routers to transfer data among multiple neighboring networks, sub-networks and/or network devices. Each router typically includes multiple ports, each of which corresponds to one or more interfaces and subinterfaces. Configuration data is used to define characteristics to be associated with each router interface and subinterface including, for example, a speed at which the router interface will transfer data, a data encapsulation technique to be used by the router interface, one or more network devices to which the router interface is to transfer data, etc.

BRIEF DESCRIPTION OF THE DRAWINGS

FIG. 2 is a block diagram of the example router configuration tool of FIG. 1, co-located with one or more of the DSL tool servers of FIG. 1.

FIG. 3A is a block diagram of an example configuration data converter associated with the example router configuration tool of FIG. 1.

FIG. 3B depicts an example graphical user interface that can be generated by the example router configuration tool of FIG. 1.

FIGS. 4A, 4B and 4C depict a flowchart representative of example machine readable instructions that may be executed by the example router configuration tool of FIG. 1 and FIG. 2 to convert router configuration data compatible with a first router to router configuration data compatible with a second router and to generate a routing table to distribute data between the second router and an upstream distribution router.

The figures are not to scale. Wherever possible, the same reference numbers will be used throughout the drawing(s) and accompanying written description to refer to the same or like parts.

DETAILED DESCRIPTION

Figure 1:
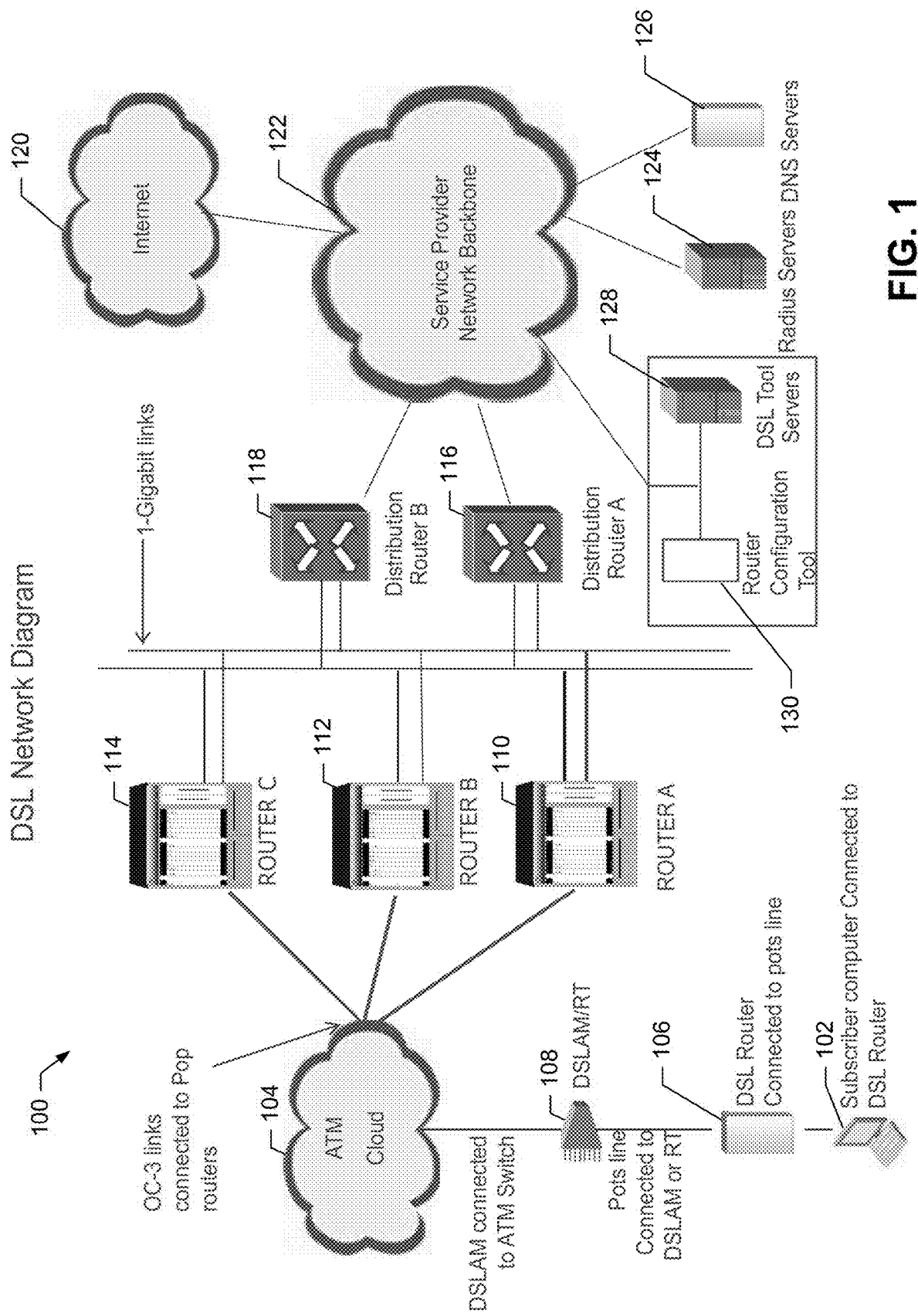
FIG. 1 is a block diagram of an example digital subscriber network having an example router configuration tool as disclosed herein.

Large networks can include thousands of routers to transfer data among multiple neighboring networks, sub-networks and/or network devices. Each router typically includes multiple ports, each of which corresponds to one or more interfaces and subinterfaces. Configuration data is used to define characteristics to be associated with each router interface and subinterface including, for example, a speed at which the router interface transfers data, a data encapsulation technique to be used by the router interface, one or more network devices to which the router interface is to transfer data, etc.

As networks grow and evolve, first routers manufactured by a first entity are often replaced by second routers manufactured by a different, second entity. In some instances one or more data lines, each coupled to inputs/ports of one of the first routers, are to be re-routed/migrated (either temporarily or permanently) to selected, corresponding inputs of one of the second routers. To accomplish the re-routing, the selected, corresponding inputs of the second routers are reconfigured as needed to carry the data associated with the data lines to be migrated. However, the format of configuration data used to configure the ports, interfaces and subinterfaces associated with routers manufactured by different entities are typically incompatible. As a result, the configuration data associated with the inputs of the first router(s) must be manually converted to a format compatible with the selected, corresponding inputs of the second router(s). However, such re-routing efforts (also referred to as router migration) can involve the conversion of the configuration data associated with hundreds and even thousands of subinterfaces, thereby requiring hundreds and sometimes thousands of hours of labor.

Example methods and apparatus disclosed herein include converting configuration data associated with a first router by receiving via a graphical user interface a user selection of a first port associated with the first router and a second port associated with a second router and detecting data flow on a subinterface associated with the first port. The method can also include converting the configuration data associated with the subinterface from a first format to a second format based on the detected data flow.

In some examples, the method also includes preventing conversion of the configuration data associated with the subinterface, if data flow is not detected. In some examples, the method further includes using a first Internet Protocol address and a second Internet Protocol address to identify a number of subnets associated with an Internet Protocol pool and using the identified number of subnets to identify a mask to be used to convert Internet Protocol pool configuration data from a third format to a fourth format.

In some examples, the method can include verifying, with a processor, that a first number of permanent virtual circuits identified in the configuration data collected from the first router is equal to a second number of permanent virtual circuits identified in the converted configuration data. The method can also include receiving via the graphical user interface an input indicating whether Internet Protocol pool interfaces and null0 route interfaces are to be converted. In some examples, the method includes receiving via the graphical user interface an input indicating whether a distribution route configuration is to be generated.

In some examples, the method can include determining whether the configuration data includes an interface description and if the interface description is not included in the configuration data, defining an Internet Protocol interface with a unique name and Internet Protocol addressing for a corresponding permanent virtual circuit interface associated with the second router. In some example methods if the interface description is included in the configuration data, the interface description is used as the Internet Protcol name and Internet Protocol addressing of the corresponding permanent virtual circuit interface.

Turning to the figures, FIG. 1 is a block diagram of an example distributed subscriber line ("DSL") network 100 by which digital subscriber services are provided to one or more digital subscriber devices, e.g., a digital subscriber computer 102. In some examples, the digital subscriber computer 102 is connected to an asynchronous transfer mode ("ATM") cloud 104 via a DSL router 106 and a digital subscriber line access multiplexer 108 ("DSLAM/RT") that connects multiple customer DSL interfaces to a high speed digital communication channel. In some examples, the DSL router 106 is coupled to the DSLAM/RT 108 via a plain old telephone service ("POTS"). The ATM cloud 104 represents an ATM public or private network. In some examples, the ATM cloud 104 is operated by a national telephone service provider. The ATM cloud 104 is coupled to a first edge router (e.g., a ROUTER A 110), a second edge router (e.g., a ROUTER B 112), a third edge router (e.g., a ROUTER C 114), etc. The ROUTER A, the ROUTER B, and the ROUTER C are associated with an access point to the internet (also referred to as a point of presence ("POP")). In some examples, the POP is associated with a physical location that houses servers, routers, ATM switches, digital/analog call aggregators etc. The POP may be included in a telecommunication service provider's facility. An internet or digital service provider typically has hundreds and even thousands of POPs. In some examples, the ROUTER A 110, the ROUTER B 112, and the ROUTER C 114 are coupled via 1 Gigabit links to one or more distribution routers including a first, upstream distribution router, (e.g., a DISTRIBUTION ROUTER A 116) and a second, upstream distribution router (e.g., DISTRIBUTION ROUTER B 118).

The ROUTER A 110 interfaces and the ROUTER B interfaces 112 are configured using different, incompatible configuration data formats. In some examples, the ROUTER A 110 and the ROUTER B 112 are manufactured by different entities. In some such examples, the ROUTER A 110 is an E-Series router manufactured by Juniper Networks, Inc. and the ROUTER B 112 is a SmartEdge router manufactured by Ericsson.

In some examples, the DISTRIBUTION ROUTER A 116 and the DISTRIBUTION ROUTER B router 118 supply the subscriber computer 102 with DSL access to the internet 120 via a subscriber service provider network backbone 122. A remote authentication dial-in user service server 124 provides centralized authentication, authorization, and accounting management to control subscriber access to and usage of the subscriber services and one or more DNS servers 126 manage the names of web sites and other Internet domains. A set of DSL tool servers 128 control the type of high speed Internet access to be provided to the subscriber computer device. A router configuration tool 130 to enable the re-routing of data lines coupled to one or more of the inputs of ROUTER A 110 to selected inputs of the ROUTER B 112 can be collocated with the DSL tool servers 128 and/or implemented using the DSL tool servers 128.

FIG. 2 is an example implementation of the example router configuration tool 130 shown in FIG. 1. In some examples, the router configuration tool 130 includes an example selector tool 202 coupled to a display device 204 to allow a user of the router configuration tool 130 to select one or more ROUTER A 110 ports having data input lines to be migrated from the ROUTER A 110 to the ROUTER B 112. The selector tool 202 also permits the user to select corresponding ports of the ROUTER B 112 to which the data input lines are to be migrated. An example first data transceiver 206 connects to the ROUTER A 110 to collect configuration data associated with the selected physical ports of the ROUTER A 110 and corresponding logical interfaces and logical subinterfaces. An example configuration data converter 208 converts the collected configuration data to a format compatible with the ROUTER B 112. In some examples, a verification tool 210 counts a number of permanent virtual circuits (PVCs) associated with the ROUTER A configuration data and a number of (PVCs) associated with converted configuration data (e.g., the configuration data to be used to configure the selected corresponding input/ports of the ROUTER B 112). If the numbers of PVCs are the same, the verification process is completed and an example configuration file generator 212 creates a configuration file containing the converted configuration information. If the numbers of PVCs are not the same, the conversion failed and the verification tool 210 causes the display 204 to alert the user to the failed conversion.

In some examples, the example conversion file generator 212 causes an example configuration file output/upload tool 214 to transmit the configuration file to the ROUTER B 112. If the user opts to use one or more displayed commands to view and input the configuration data, the configuration file generator 212 creates a web file containing the configuration data and transfers the configuration data web file to the display 204.

In some examples, the example configuration data converter 208 converts the configuration data of each of the ROUTER A ports associated with data lines to be re-routed/migrated one at a time. In some examples, when the configuration data associated with the last such ROUTER A port has been converted, the configuration data converter 208 converts one or more ROUTER A IP pool interfaces and null0 routes that have been selected for conversion by the user via the selector tool 202. The example configuration file generator 212 creates an IP Pool configuration file containing the converted configuration data for the IP pool interfaces and null0 routes for transmission by the example configuration file upload/output tool 214 to the ROUTER B 112 and to the display 204. In some examples, the configuration data converter 208 can create a configuration delete file identifying configuration data to be removed from the ROUTER B prior to the migration. The user can use one or more commands presented on the display 204 to cause the ROUTER B 112 to use the configuration delete file to cause the removal of any existing ROUTER B configuration data associated with the ROUTER B ports to which the data lines are to be migrated to be removed. If the user has selected to have information identifying distribution route configurations generated, the example configuration data converter 208 can convert a first distribution route configuration identifying a manner in which communications are directed to the ROUTER A from distribution routers upstream (e.g., the DISTRIBUTION ROUTER A 116, the DISTRIBUTION ROUTER B 118, etc.) of the ROUTER A 110 to a second distribution route configuration identifying a manner in which communications are to be directed to the ROUTER B from distribution routers (e.g., the DISTRIBUTION ROUTER A 116, the DISTRIBUTION ROUTER B 118, etc.) upstream of the ROUTER B 112. In some examples, the devices of the router configuration tool 130 depicted in FIG. 2 are communicatively coupled in any desired manner via a first data bus 216.

FIG. 3A is a block diagram of the example configuration data converter 208 shown in FIG. 2. In some examples, the configuration data converter 208 includes an example data converter controller 302 (referred to herein as the controller 302) to control an example PPPoX interface converter 304, an example bridge 1483 interface converter 306, an example static route interface converter 308 and an IP Pool and null0 route interface converter 310. A PPPoX interface designates an interface configured to carry data in any of a family of encapsulating protocols that implement of point to point protocols. A bridge 1483 interface is an interface configured to carry data compatible with a bridged ethernet over ATM or Frame Relay. In some examples, the controller 302, the PPPOX interface converter 304, the bridge 1483 interface converter 306, the static route interface converter 308, and the IP Pool and null0 route interface converter 310 are communicatively coupled in any desired manner via a second example data bus 312. A second example data transceiver 314, also coupled to the second example data bus 312, receives and transmits communication information from/to the configuration data converter 208 and the other devices depicted in FIG. 2 and described above.

FIG. 3B is an example graphical user interface 316 that can be generated by the example selector tool 202 for presentation at the display 204. In some examples, the graphical user interface 316 presents one or more pull-down fields that identify ports associated with the ROUTER A 318 and one or more pull-down fields that identify ports associated with the ROUTER B 320. The graphical user interface can also include one or more radial buttons for use in selecting one or more configuration operations to be performed. For example, a first radial button 322 can be selected by the user to indicate that IP pool processing is to be performed as described in further detail below. A second radial button 324 can be selected by the user to indicate that distribution route configurations are to be generated and emailed to the user.

While an example manner of implementing the router configuration tool 130 of FIG. 1 is illustrated in FIG. 2 and FIG. 3, one or more of the elements, processes and/or devices illustrated in FIG. 2 and FIG. 3 may be combined, divided, re-arranged, omitted, eliminated and/or implemented in any other way. Further, the example selector tool 202, the example display 204, the example first data transceiver 206, the example configuration data converter 208, the example verification tool 210, the example configuration file generator 212, the example configuration file output/upload tool 214, the example controller 302, the example PPPOX interface converter 304, the example bridge 1483 interface converter 306, the example static route interface converter 308, the example IP Pool and null0 route interface converter 310, the example second data bus 312, the example second data transceiver 314 and/or, more generally, the example router configuration tool 130 could be implemented by one or more analog or digital circuit(s), logic circuits, programmable processor(s), application specific integrated circuit(s) (ASIC(s)), programmable logic device (s) (PLD(s)) and/or field programmable logic device(s) (FPLD(s)). When reading any of the apparatus or system claims of this patent to cover a purely software and/or firmware implementation, at least one of the example selector tool 202, the example display 204, the example first data transceiver 206, the example configuration data converter 208, the example verification tool 210, the example configuration file generator 212, the example configuration file output/upload tool 214, the example controller 302, the example PPPOX interface converter 304, the example bridge 1483 interface converter 306, the example static route interface converter 308, the example IP Pool and null0 route interface converter 310, the example second data bus 312, the example second data transceiver 314 and/or the example router configuration tool 130 is/are hereby expressly defined to include a tangible computer readable storage device or storage disk such as a memory, a digital versatile disk (DVD), a compact disk (CD), a Blu-ray disk, etc. storing the software and/or firmware. Further still, the example router configuration tool 130 of FIG. 1 may include one or more elements, processes and/or devices in addition to, or instead of, those illustrated in FIG. 2 and FIG. 3, and/or may include more than one of any or all of the illustrated elements, processes and devices.

Flowcharts representative of example machine readable instructions for implementing the router configuration tool 130 of FIGS. 1, 2 and 3 are shown in FIGS. 4A, 4B, 4C, 5, 6, 7, 8 and 9. In these examples, the machine readable instructions comprise one or more programs for execution by a processor such as the processor 1012 shown in the example processor platform 1000 discussed below in connection with FIG. 10. The programs may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example programs are described with reference to the flowcharts illustrated in FIGS. 4A, 4B, 4C and FIGS. 5-9, many other methods of implementing the example router configuration tool 130 may alternatively be used. For example, the order of execution of the blocks may be changed, and/or some of the blocks described may be changed, eliminated, or combined.

As mentioned above, the example processes of FIGS. 4A, 4B, 4C and FIGS. 5-9 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4A, 4B, 4C and FIGS. 5-9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 4A:
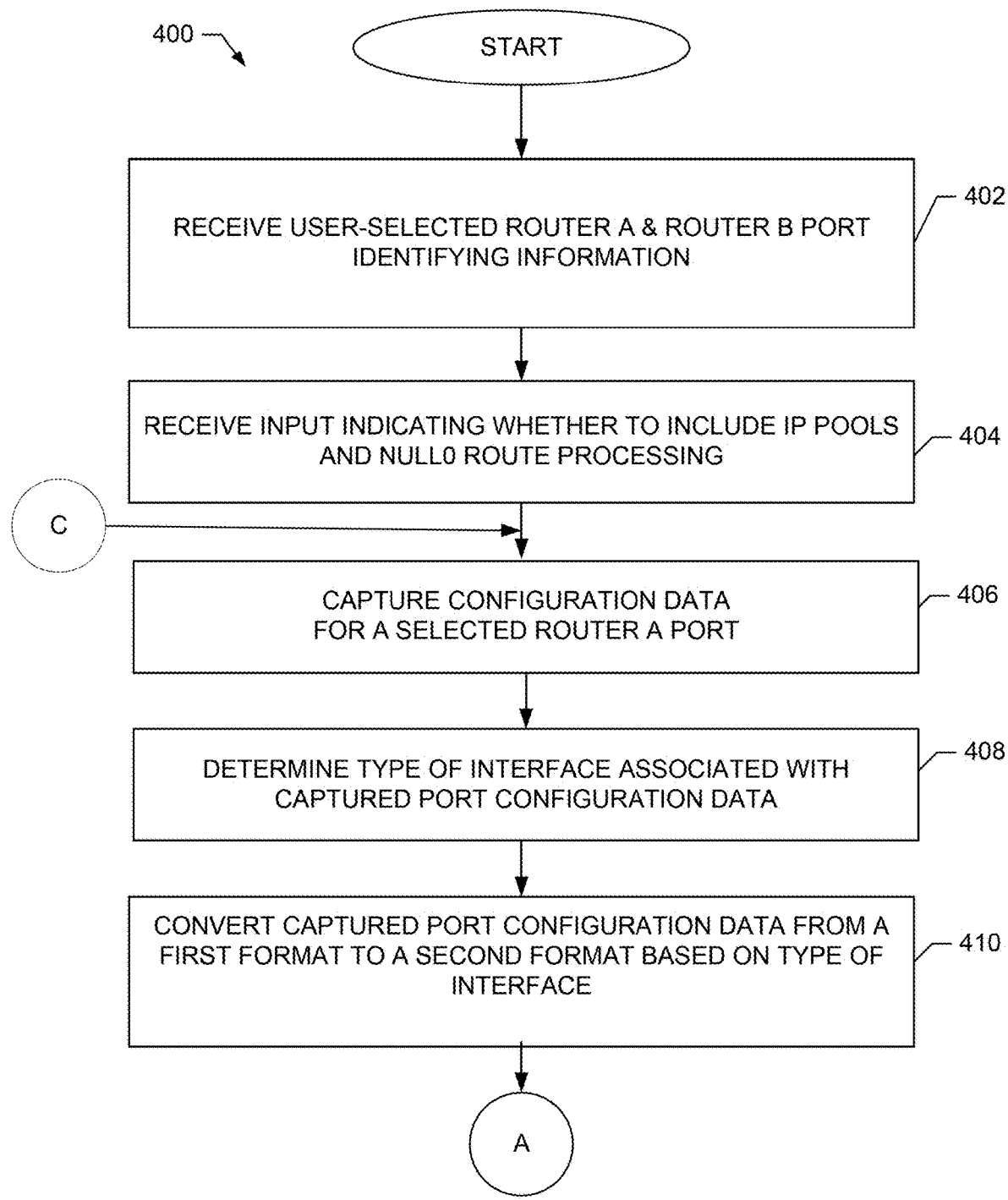

Machine readable instructions 400 that can be used to implement the router configuration tool 130 of FIG. 1, FIG. 2 and FIG. 3 are shown in FIGS. 4A, 4B and 4C. With reference to the preceding figures and associated written descriptions, execution of the machine readable instructions 400 begins at a block 402 at which the first data transceiver 206 of the router configuration tool 130 receives information identifying one or more user-selected ROUTER A ports having data input lines to be migrated from the ROUTER A to the ROUTER B. The router configuration tool 130 also receives information identifying one or more corresponding user-selected ROUTER B ports to receive the data lines to be migrated. In some examples, the example selector tool 202 generates a graphical user interface to present one or more pull-down fields by which the user can select the ROUTER A and the ROUTER B ports at the display 204. In some examples, the ROUTER A ports and the ROUTER B ports include information identifying the logical interface and logical sub-interfaces associated with each selected port.

At a block 404, the first data transceiver 206 receives an indication as to whether to perform IP Pool and null0 route processing. In some examples, the selector tool 202 causes the display 204 to present a graphical user interface having, for example, a radial button that the user can select to indicate that IP Pool and null0 route processing is to be performed.

At a block 406, the example configuration data converter 208 causes the first data transceiver 206 to capture, from the ROUTER A, port configuration data associated with a first of the user-selected ROUTER A ports. At a block 408, the controller 302 (see FIG. 3) of the configuration data converter 208 identifies the type of interface associated with the captured port information. Depending on the type of interface (e.g., static route interface, PPPOX interface, bridge 1483 interface), the controller 302 causes a corresponding one of the static route interface converter 308, the PPPOX interface converter 304 or the bridge 1483 interface converter 306 to convert the captured port configuration information from a first interface format compatible with the ROUTER A to a second interface format compatible with the ROUTER B.

The machine readable instructions of FIG. 4A continue at a block 412 of FIG. 4B. In some examples at the block 412, the verification tool 210 of the router configuration tool 130 determines whether the format conversion was successful. In particular, the verification tool 210 may count a number of PVCs associated with the pre-converted configuration data and a number of PVCs associated with the converted configuration data. If the numbers of PVCs are not equal, the conversion may be considered failed, and the method ends as indicated by the connector B connecting the output of the block 412 of FIG. 4B to the end block of FIG. 4C.

If the numbers of PVCs are equal, the format conversion may be considered successful, the verification process is completed and the example configuration file generator 212 creates a configuration file containing the converted configuration data at a block 414. In some examples, the example conversion file generator 212 causes the example configuration file output/upload tool 214 to transmit the configuration file to the ROUTER B at a block 414. At a block 416, if the user opts to view and input the configuration data, the conversion file generator 212 creates a web file containing the configuration data and transfers the configuration data web file to the display 204.

In some examples, at a block 418 the example configuration data converter 208 determines whether configuration data associated with another port is to be converted. If so, the method continues at the block 406 as indicated by the connector C connecting the output of the block 418 of FIG. 4B to the input of the block 406 of FIG. 4A. If there is no additional configuration data to be converted (e.g., configuration data associated with all selected ports has been converted), the method continues at the block 420 (see FIG. 4C) at which the configuration data converter 208 determines whether IP pool conversion and null0 route conversion is to be performed by checking the input received at the block 404 (see FIG. 4A). If so, the IP pool and null0 route interface converter 310 converts the IP pool and null0 route configuration data from a first IP pool and null0 route format compatible with the ROUTER A to a second IP pool and null0 route format compatible with the ROUTER B at the block 422. In some examples, also at the block 422, the configuration file generator 212 creates an IP Pool configuration file containing the converted IP pool and null0 route configuration data.

At a block 424, the example configuration data converter 208 causes the example first data transceiver 206 to transmit the IP Pool configuration file to the ROUTER B and to the display 204. The configuration data converter 208 also causes the display 204 to present commands by which the user can opt to view the IP Pool configuration file.

At a block 426, the example configuration data converter can create a configuration delete file for transfer by the example first data transceiver to the ROUTER B and to the display 204, as described above. Also, at the block 426, the configuration data converter 208 causes the display 204 to present commands by which the user can opt to view and input the configuration delete file. In some examples, the configuration delete file identifies configuration data to be removed from the ROUTER B prior to the migration. The user can use one or more commands presented on the display 204 to cause the ROUTER B 112 to use the configuration delete file to cause the removal of any existing ROUTER B configuration data associated with the ROUTER B ports to which the data lines are to be migrated to be removed.

At a block 428, the example configuration data converter 208 generates a distribution route configuration to be used by the ROUTER B to enable communications between the ROUTER B and appropriate ones of the upstream distribution routers (e.g., the DISTRIBUTION ROUTER A, the DISTRIBUTION ROUTER B, etc.). Also at the block 428, the configuration data converter 208 can cause the generated distribution route configuration to be emailed to the user. In some examples, the user indicates that the distribution route configuration is to be generated using the selector tool 202. In some examples, at a block 430, the router configuration tool 130 causes one or more of the distribution route configuration files created by the router configuration tool 130 to be loaded at the ROUTER B during, for example, a desired router maintenance window. Loading the distribution route configuration file at the ROUTER B causes the corresponding interfaces of the ROUTER B to be configured to route data carried on the data lines to be migrated from the ROUTER A to the ROUTER B.

Figure 5:
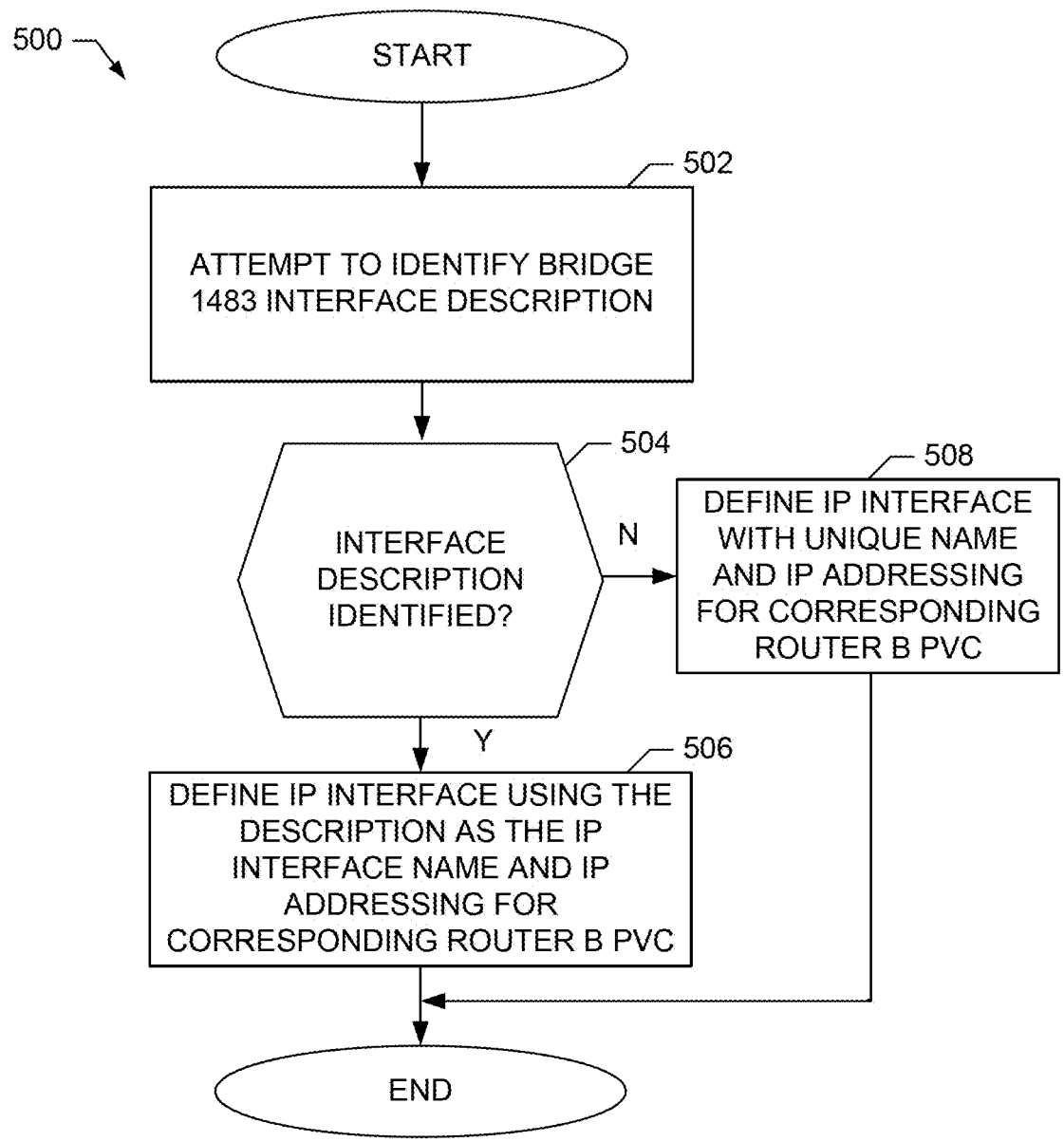
FIG. 5 is a flowchart representative of example machine readable instructions that may be executed by the example configuration data converter of FIG. 3 to determine a name of a permanent virtual circuit to be configured in the second router.

Machine readable instructions 500 that can be used to implement the example bridge 1483 interface converter 306 (see FIG. 3) of the configuration data converter 208 of FIG. 2 are shown in FIG. 5. With reference to the preceding figures and associated written descriptions, execution of the machine readable instructions 500 begins at a block 502 at which the bridge 1483 interface converter 306 uses ROUTER A port configuration data associated with a bridge 1483 interface of ROUTER A to attempt to identify a description of a corresponding bridge 1483 interface being converted. At a block 504, the bridge 1483 interface converter 306 determines whether the description has been identified. If identified, the bridge 1483 interface converter 306 uses the interface description as the name of an IP interface and IP addressing for a corresponding permanent virtual circuit associated with the ROUTER B at a block 506 and the method ends. If a description is not identified at a block 508, the bridge 1483 interface converter 306 defines an IP interface with a unique name and IP addressing for the corresponding permanent virtual circuit associated with the ROUTER B and the method ends.

Figure 6:
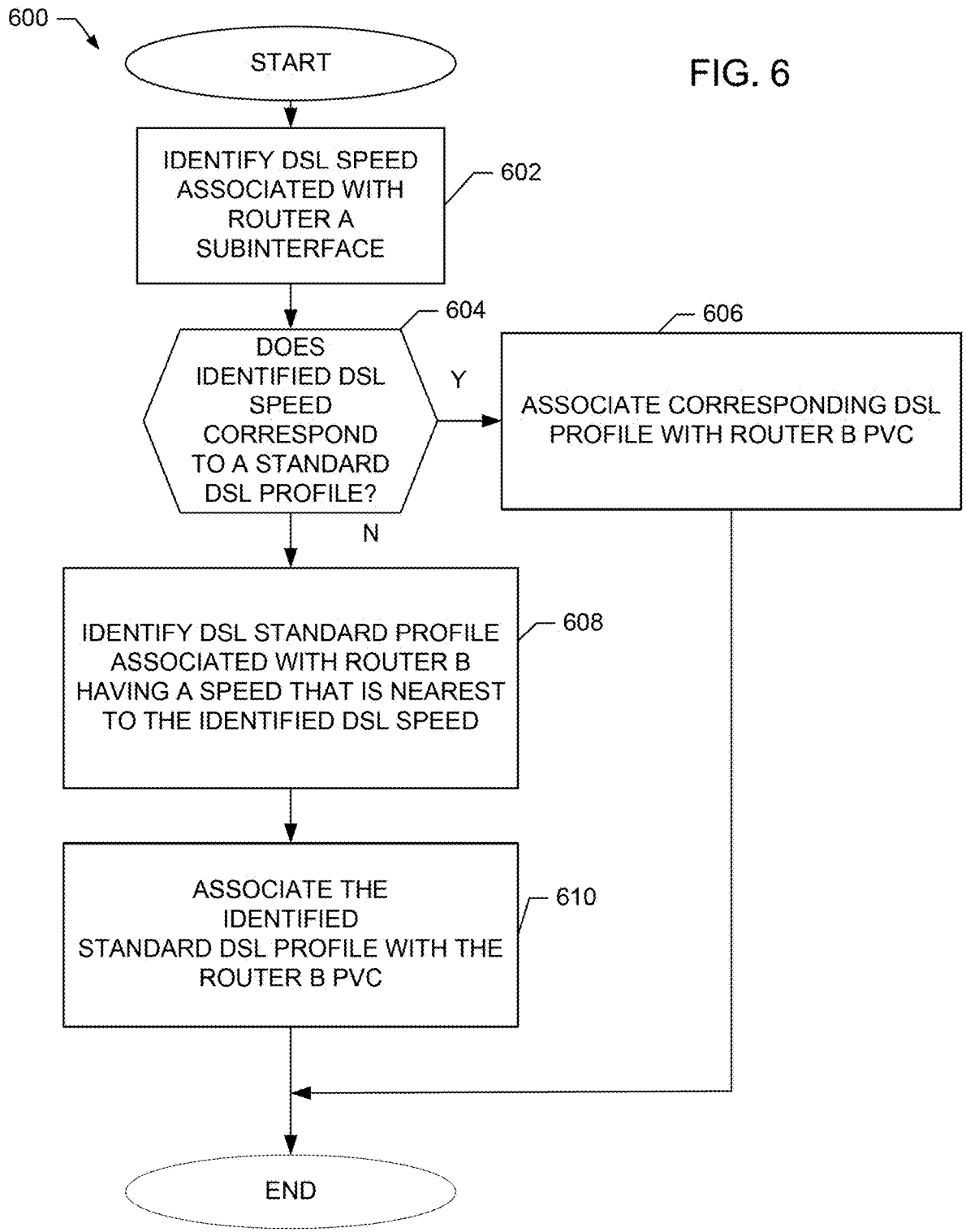
FIG. 6 is a flowchart representative of example machine readable instructions that may be executed by the example configuration data converter of FIG. 3 to determine a digital subscriber line (DSL) profile to be assigned to an interface to be configured in the second router.

Machine readable instructions 600 that can be used to implement either of the ATM interface converters (e.g., the PPPOX interface converter 304 and/or the bridge 1483 interface converter 306 (both shown in FIG. 3)) are shown in FIG. 6. With reference to the preceding figures and associated written descriptions, execution of the machine readable instructions 600 begins at a block 602 at which the converter uses ROUTER A subinterface configuration data to identify a DSL speed corresponding to a ROUTER A subinterface. At a block 604, the ATM interface converter (e.g., the PPPOX interface converter 304 and/or the bridge 1483 interface converter 306) determines whether the identified DSL speed corresponds to a standard DSL profile associated with the ROUTER B. If so, at a block 606, the ATM interface converter (e.g., the PPPOX interface converter 304 and/or the bridge 1483 interface converter 306) associates the corresponding standard DSL profile with the corresponding ROUTER B PVC interface when creating the converted interface configuration data.

If the identified DSL speed does not correspond to a standard DSL profile of the ROUTER B, the ATM interface converter (e.g., the PPPOX interface converter 304 and/or the bridge 1483 interface converter 306) identifies a standard DSL profile having a speed nearest to the identified DSL speed at a block 608. At a block 610, the ATM interface converter (e.g., the PPPOX interface converter 304 and/or the bridge 1483 interface converter 306) associates the identified standard DSL profile with the corresponding ROUTER B PVC interface when creating the converted interface configuration data for the ROUTER B PVC interface. After the identified standard DSL profile has been associated with the corresponding ROUTER B PVC interface, the method ends.

Figure 7:
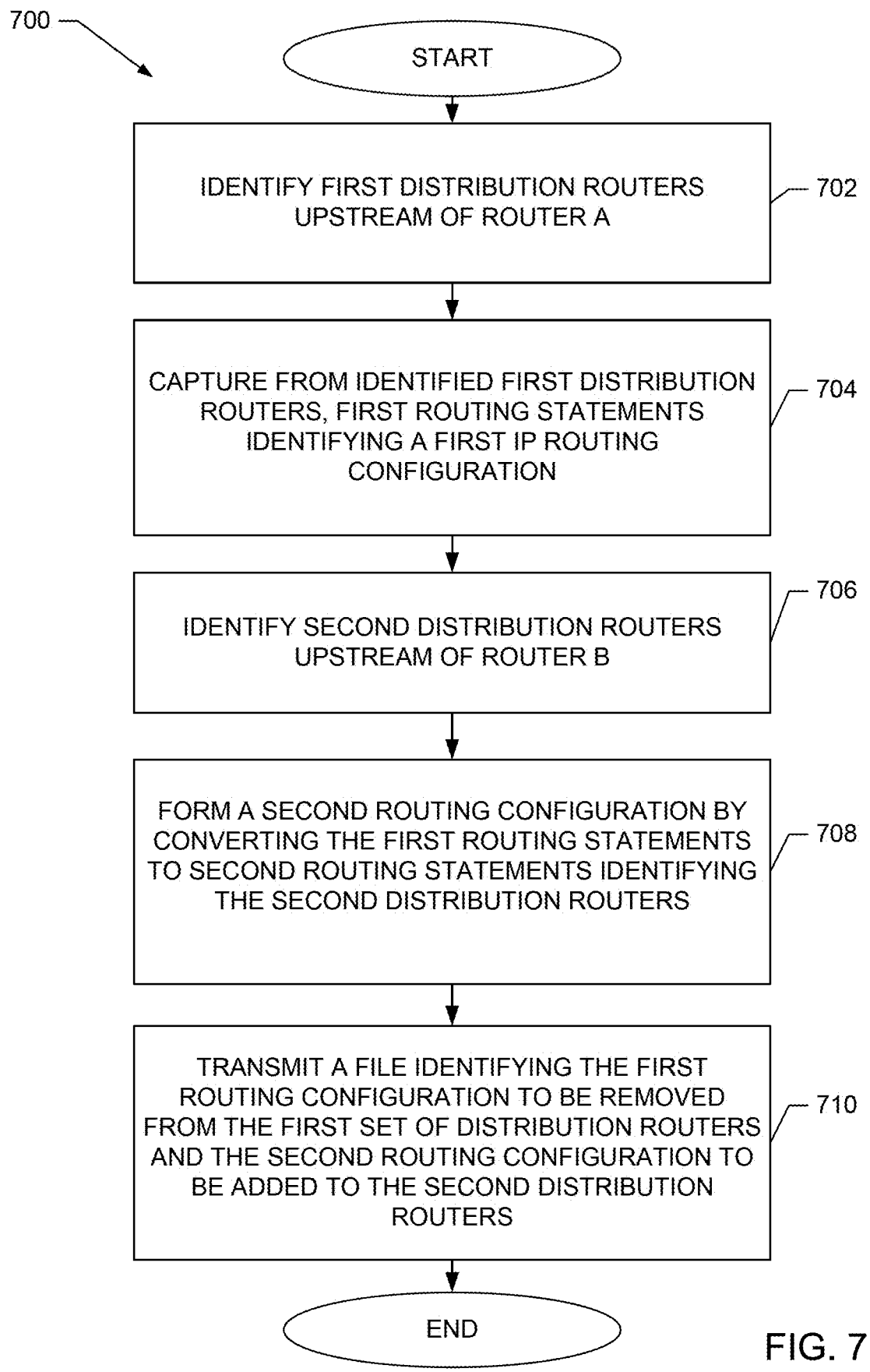
FIG. 7 is a flowchart representative of example machine readable instructions that may be executed by the example configuration data converter of FIG. 3 to generate a routing distribution between the second router and an upstream distribution router.

Machine readable instructions 700 that can be used to implement the example configuration data converter 208 of FIG. 2 and FIG. 3 are shown in FIG. 7. With reference to the preceding figures and associated written descriptions, execution of the machine readable instructions 700 begins at a block 702 at which the example configuration data converter 208 identifies a first set of distribution routers upstream of the ROUTER A. At a block 704, the configuration data converter 208 captures a first distribution route configuration from the identified first distribution routers. The first distribution route configuration identifies a manner in which communications are directed to the ROUTER A from the first set of distribution routers. At a block 706, the configuration data converter 208 identifies a second set of distribution routers upstream of the ROUTER B. At a block 708, the configuration data converter 208 forms a second distribution route configuration by converting the routing statements of the first routing configuration to identify the second set of distribution routers. The second distribution route configuration identifies a manner in which communications will be directed to the ROUTER B from the second set of distribution routers. In some examples, at a block 710, the configuration data converter 208 causes the example first data transceiver 206 (see FIG. 2) to transmit a file identifying the first distribution route configuration to be removed from the first set of distribution routers and identifying the second distribution route configuration to be added to the second set of distribution routers. In some examples, the file is also transmitted via email to the user for viewing at the block 710 after which the method ends.

When applicable, the example configuration data converter 208 can also identify subscribers associated with the ROUTER A who receive legacy DSL services and to collect IP interface and IP routing statements corresponding to the identified subscribers from the ROUTER A. The configuration data converter 208 can also convert the IP interface and IP routing statements to equivalent IP interface and IP routing statements compatible with the ROUTER B. In some examples, the resulting converted IP interface and IP routing statements can also be emailed to the user for viewing.

Figure 8:
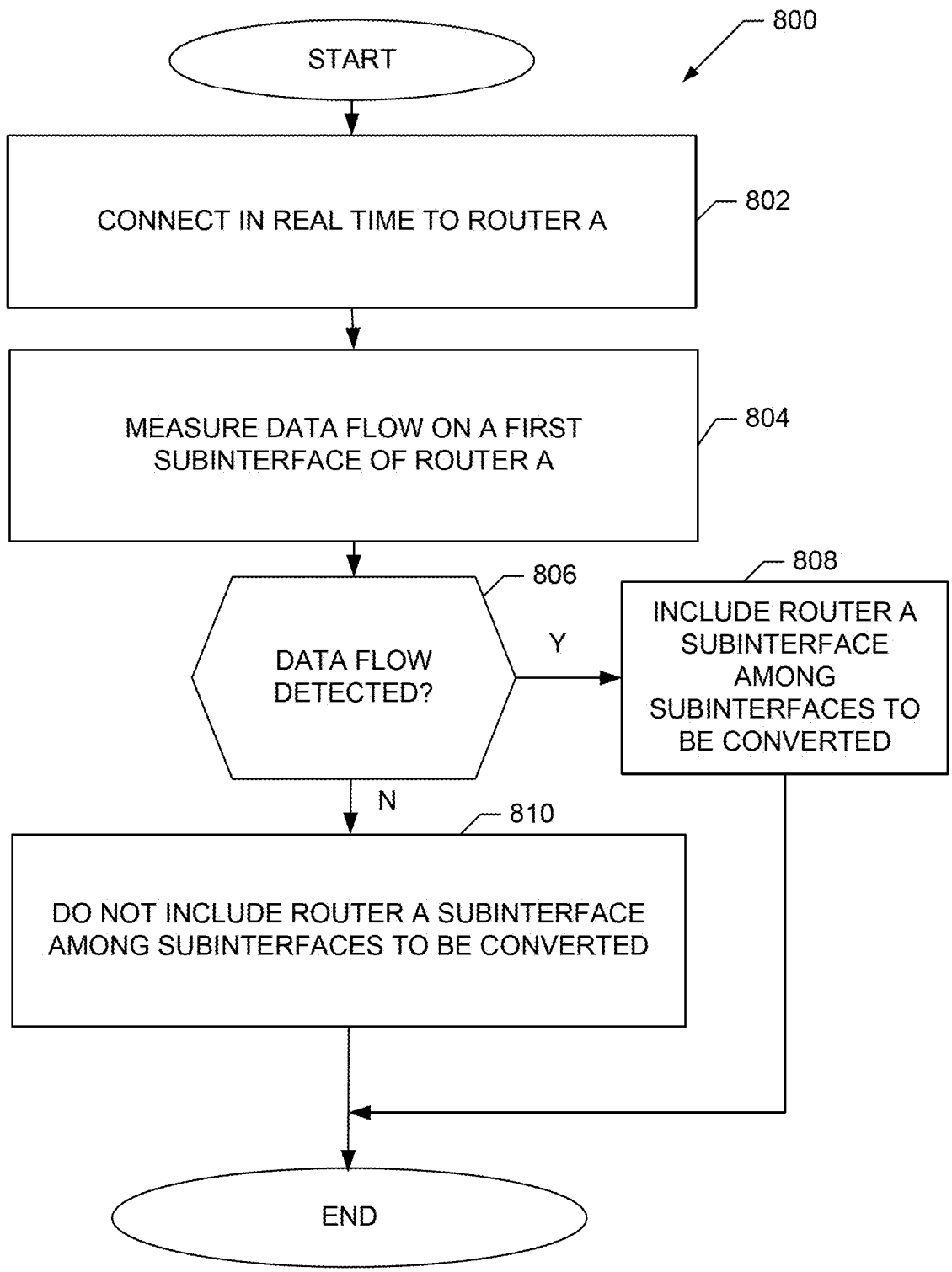
FIG. 8 is a flowchart representative of example machine readable instructions that may be executed by the example configuration data converter of FIG. 3 to prevent one or more unused subinterfaces associated with the first router from being configured to carry data by an interface in the second router.

Machine readable instructions 800 that can be used to implement the example routing configuration tool 130 of FIG. 2 are shown in FIG. 8. With reference to the preceding figures and associated written descriptions, execution of the machine readable instructions 800 begins at a block 802 at which the router configuration tool 130 connects to the ROUTER A in real time and measures the data flow on a first subinterface of the ROUTER A at a block 804. At a block 806, the router configuration tool 130 determines whether data flow is detected the first subinterface. If data is flow is detected, at a block 808, the first subinterface is included among the ROUTER A subinterfaces to be converted. If data flow is not detected at a block 810, the first subinterface is not included among the ROUTER A subinterfaces to be converted. The example router configuration tool 130 then determines whether more subinterfaces of the ROUTER A are to be processed and, if so, the method returns to the block 804 and blocks subsequent thereto as described above. If all of the subinterfaces of the ROUTER A have been processed, the method of FIG. 8 ends.

Figure 9:
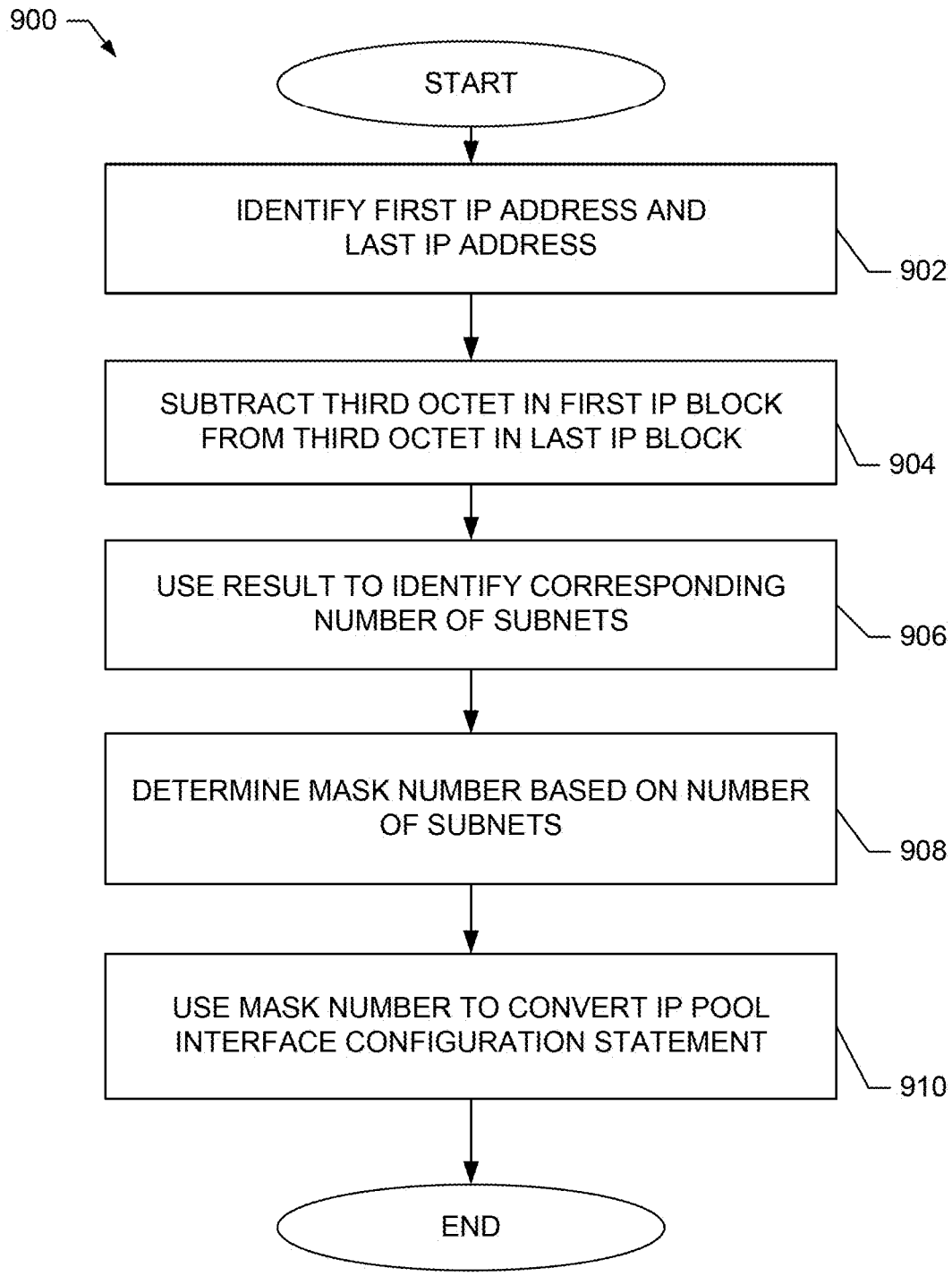
FIG. 9 is a flowchart representative of example machine readable instructions that may be executed by the configuration data converter of FIG. 3 to determine a size of a block of IP addresses to be associated with one or more interfaces of the second router.

Machine readable instructions 900 that can be used to implement the IP pool and null0 route interface converter 310 (see FIG. 3) of the example configuration data converter 208 of FIG. 2 and FIG. 3 are shown in FIG. 9. With reference to the preceding figures and associated written descriptions, execution of the machine readable instructions 900 begins at a block 902 at which the IP pool and null0 route interface converter 310 identifies a first IP block and a second IP block associated with a ROUTER A IP Pool interface to be converted. At a block 904, the IP pool and null0 route interface converter 310 subtracts the third octet in the first IP block from the third octet in the last IP block. At a block 906, the result of the calculation performed at the block 904 is used to identify a corresponding number of subnets. At a block 908, a mask number is determined based on the number of subnets. The mask number can be used to convert a corresponding IP configuration statement in a format compatible with the ROUTER A to a corresponding IP configuration statement in a format compatible with the ROUTER B at a block 910 after which the method ends.

Figure 10:
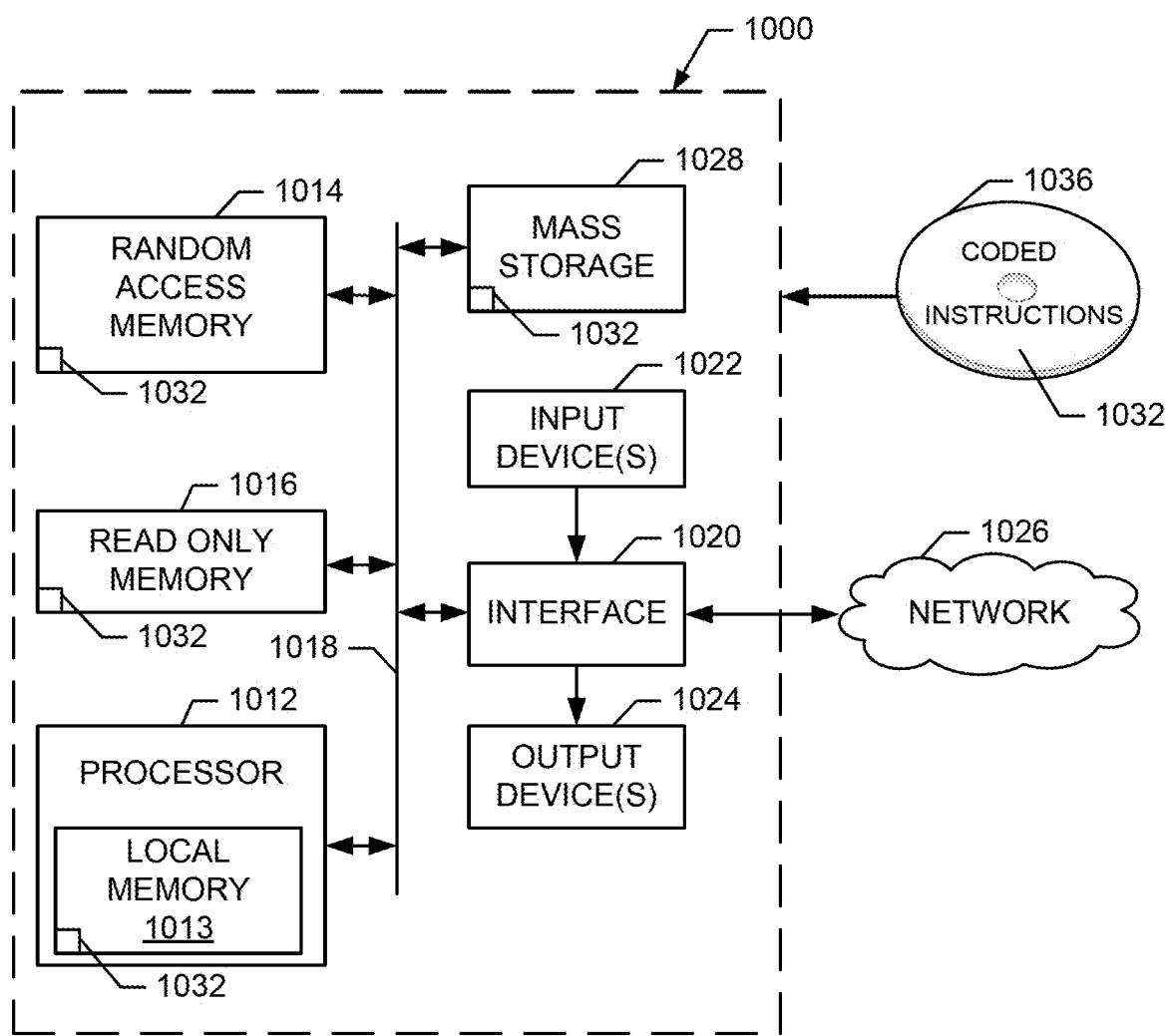
FIG. 10 is a block diagram of an example processing system that may execute the example machine readable instructions of FIGS. 4A, 4B, 4C, 5, 6, 7, 8, and/or 9 to implement the example router configuration tool of FIG. 1 and FIG. 2, and/or the example configuration data converter of FIG. 3.

FIG. 10 is a block diagram of an example processor platform 1000 capable of executing the instructions of FIGS. 4A, 4B, 4C, 5, 6, 7, 8 and 9 to implement the routing configuration tool of FIG. 1 and FIG. 2. The processor platform 1000 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The inputqj device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives.

The coded instructions 1032 of FIGS. 4A, 4B, 4C, 5, 6, 7, 8 and 9 may be stored in the mass storage device 1028, in the volatile memory 1014, in the non-volatile memory 1016, and/or on a removable tangible computer readable storage medium such as a CD or DVD.

From the foregoing, it will appreciated that above disclosed methods and apparatus enable the migration of one or more data lines associated with a first router to a second router by converting configuration data associated with large numbers of subinterfaces. In addition, the example methods and apparatus reduce the amount of time, thus, the costs required to perform such a migration effort.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed:

1. A system comprising:
   a processor; and
   a memory that stores executable instructions that, when executed by the processor, facilitate performance of operations, the operations comprising:
   identifying a first port of a first router having a first set of data lines;
   identifying a second port of a second router to receive the first set of data lines to be migrated from the first port of the first router, wherein the first router and the second router employ different, incompatible configuration data formats;
   capturing first port configuration data associated with the first port of the first router;
   identifying a type of interface associated with the first port configuration data;
   converting the first port configuration data from a first format compatible with the first router to a second format compatible with the second router based on the identified type of interface, wherein the converting comprises:

determining whether data flow is detected in respective sub-interfaces associated with the first port,
converting first configuration data of the first port configuration data associated with a first group of the respective sub-interfaces for which the data flow is detected, the converting resulting in converted first port configuration data in the second format, and
foregoing converting second configuration data of the first port configuration data associated with a second group of the respective sub-interfaces for which the data flow is not detected; and
generating a configuration file comprising the converted first port configuration data in the second format.

2. The system of claim 1, configuring the second port of the second router based on the configuration file.

3. The system of claim 2, wherein the operations further comprise, prior to the configuring of the second port:
identifying second port configuration data to be removed from the second port of the second router, the second port configuration data related to a second set of data lines previously carried by the second router;
creating a configuration delete file comprising the second port configuration data to be removed from the second port of the second router prior to migrating the first set of data lines from the first router to the second router; and
using the configuration delete file to remove the second port configuration data from the second port of the second router.

4. The system of claim 1, wherein the operations further comprise:
monitoring the respective sub-interfaces associated with the first port for the data flow.

5. The system of claim 1, wherein the operations further comprise determining whether to convert an Internet Protocol pool interface of the first port of the first router.

6. The system of claim 5, wherein the operations further comprise:
in response to determining that the Internet Protocol pool interface is to be converted:
identifying a beginning Internet Protocol address and a last Internet Protocol address associated with an Internet Protocol pool configuration statement;
identifying a difference between a third octet in the beginning Internet Protocol address and a third octet in the last Internet Protocol address;
identifying a corresponding number of subnets based on the difference;
determining a mask number based on the corresponding number of subnets;
converting the Internet Protocol pool configuration statement to a converted Internet Protocol pool configuration statement based on the mask number; and
transmitting the converted Internet Protocol pool configuration statement as an Internet Protocol pool configuration file to the second router.

7. The system of claim 1, wherein the operations further comprise generating a distribution route configuration to be used by the second router to enable the second port of the second router to be configured to route data carried on the first set of data lines to be migrated from the first port of the first router to the second port of the second router.

8. A non-transitory machine-readable medium comprising executable instructions that, when executed by a processor of a system, facilitate performance of operations, the operations comprising:
identifying a second port of a second router to receive a first set of data lines to be migrated from a first port of a first router, wherein the first router and the second router use different, incompatible configuration data formats;
capturing first port configuration data associated with the first port of the first router data;
identifying a type of interface associated with the captured first port configuration data;
converting the first port configuration data from a first format compatible with the first router to a second format compatible with the second router based on the type of interface, wherein the converting comprises
determining whether data flow is detected in respective sub-interfaces associated with the first port,
converting first configuration data of the first port configuration data associated with a first group of the respective sub-interfaces for which the data flow is detected, the converting resulting in converted first port configuration data in the second format, and
preventing converting of second configuration data of the first port configuration data associated with a second group of the respective sub-interfaces for which the data flow is not detected; and
generating a configuration file containing the converted first port configuration data in the second format.

9. The non-transitory machine-readable medium of claim 8, wherein the operations further comprise configuring the second port of the second router based on the configuration file.

10. The non-transitory machine-readable medium of claim 9, wherein the operations further comprise:
identifying second port configuration data to be removed from the second port of the second router prior to configuring of the second port, the second port configuration data related to a second set of data lines previously carried by the second router;
creating a configuration delete file comprising the second port configuration data to be removed from the second port of the second router prior to migrating the first set of data lines from the first router to the second router; and
removing the second port configuration data from the second port of the second router based on the configuration delete file.

11. The non-transitory machine-readable medium of claim 8, wherein the operations further comprise:
monitoring the respective sub-interfaces associated with the first port for the data flow.

12. The non-transitory machine-readable medium of claim 8, wherein the operations further comprise determining whether to convert an Internet Protocol pool interface of the first port of the first router.

13. The non-transitory machine-readable medium of claim 12, wherein the operations further comprise:
identifying a beginning Internet Protocol address and a last Internet Protocol address associated with an Internet Protocol pool configuration statement;
identifying a difference between a third octet in the beginning Internet Protocol address and a third octet in the last Internet Protocol address;
identifying a corresponding number of subnets based on the difference;

determining a mask number based on the corresponding number of subnets;

using the mask number to convert the Internet Protocol pool configuration statement to a converted Internet Protocol pool configuration statement; and transmitting the converted Internet Protocol pool configuration statement as an Internet Protocol pool configuration file to the second router.

14. The non-transitory machine-readable medium of claim 8, wherein the operations further comprise generating a distribution route configuration to be used by the second router to enable the second port of the second router to be configured to route data carried on the first set of data lines to be migrated from the first port of the first router to the second port of the second router.

15. A method, comprising:

identifying, by a system comprising a processor, a second port of a second router to receive a first group of data lines to be migrated from a first port of a first router, the first router and the second router using different, incompatible configuration data formats;

capturing, by the system, first port configuration data associated with the first port of the first router;

identifying, by the system, a type of interface associated with the captured first port configuration data;

converting, by the system, the captured first port configuration data from a first format compatible with the first router to a second format compatible with the second router based on the identified type of interface; and generating, by the system, a configuration file containing the converted first port configuration data in the second format.

16. The method of claim 15, further comprising configuring, by the system, the second port of the second router based on the generated configuration file.

17. The method of claim 16, further comprising:

identifying, by the system, second port configuration data to be removed from the second port of the second router, the second port configuration data related to a second group of data lines previously carried by the second router;

creating, by the system, a configuration delete file comprising the second port configuration data to be removed from the second port of the second router prior to migrating the first group of data lines from the first router to the second router; and using, by the system, the configuration delete file to remove the second port configuration data from the second port of the second router.

18. The method of claim 17, further comprising monitoring, by the system, the respective sub-interfaces associated with the first port for the data flow.

19. The method claim 15, further comprising determining, by the system, whether to convert an Internet Protocol pool interface of the first port of the first router.

20. The method claim 19, further comprising:

in response to determining that the Internet Protocol pool interface is to be converted:

identifying, by the system, an initial Internet Protocol address and a last Internet Protocol address associated with an Internet Protocol pool configuration statement;

identifying, by the system, a difference between a third octet in the initial Internet Protocol address and a third octet in the last Internet Protocol address;

identifying, by the system, a corresponding number of subnets based on the difference;

determining, by the system, a mask number based on the corresponding number of subnets;

converting, by the system, the Internet Protocol pool configuration statement to a converted Internet Protocol pool configuration statement based on the mask number; and transmitting, by the system, the converted Internet Protocol pool configuration statement as an Internet Protocol pool configuration file to the second router.

* * * * *